US008251869B2

(12) United States Patent
Mizutani et al.

(10) Patent No.: US 8,251,869 B2
(45) Date of Patent: Aug. 28, 2012

(54) CONTROL SYSTEM AND SADDLE-STRADDLING TYPE VEHICLE INCLUDING THE SAME

(75) Inventors: Takaaki Mizutani, Shizuoka (JP); Atsushi Miura, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 903 days.

(21) Appl. No.: 12/351,153

(22) Filed: Jan. 9, 2009

(65) Prior Publication Data

US 2009/0178874 A1 Jul. 16, 2009

(30) Foreign Application Priority Data

Jan. 16, 2008 (JP) ................................ 2008-006726

(51) Int. Cl.
*B60W 10/06* (2006.01)
*B60W 10/10* (2012.01)

(52) U.S. Cl. ........................................ 477/107; 477/110

(58) Field of Classification Search .................. 477/107, 477/110, 111, 112
See application file for complete search history.

(56) References Cited

U.S. PATENT DOCUMENTS 5,836,851 A * 11/1998 Ruman ......................... 477/107
6,358,183 B1 3/2002 Hughes et al.
6,832,150 B2 * 12/2004 Higashiyama et al. ....... 701/105

FOREIGN PATENT DOCUMENTS

JP 03-290031 A 12/1991
JP 06-146941 A 5/1994
JP 07-034916 A 2/1995

* cited by examiner

*Primary Examiner* — Edwin A Young
(74) *Attorney, Agent, or Firm* — Keating & Bennett, LLP

(57) ABSTRACT

A driver operates a shift pedal to perform shift change of a transmission via a shift mechanism provided in a vehicle. An operation of the shift pedal is detected by a load sensor. When a sliding gear and a fixed gear of the transmission continue to be separated from each other for a predetermined period of time or longer after a shifting operation by the driver is detected by a load sensor, the rotational speed of the engine is maintained within a target range by an ECU.

10 Claims, 8 Drawing Sheets

FIG. 8

| TARGET ROTATIONAL SPEED | | 20% | 30% | 40% | 50% | 60% | 70% | 80% |
|---|---|---|---|---|---|---|---|---|
| SHIFT SHOCK | UPPER POSITION SIDE | ○ | ○ | ○ | ○ | ○ | △ | × |
| | LOWER POSITION SIDE | × | △ | ○ | ○ | ○ | ○ | ○ |
| ENGAGED STATE | UPPER POSITION SIDE | × | △ | ○ | ○ | ○ | ○ | ○ |
| | LOWER POSITION SIDE | ○ | ○ | ○ | ○ | ○ | △ | × |

CONTROL SYSTEM AND SADDLE-STRADDLING TYPE VEHICLE INCLUDING THE SAME

BACKGROUND OF THE INVENTION

1. Field of the Invention

The present invention relates to a control system that assists a shifting operation of a transmission and a saddle-straddling type vehicle including the same.

2. Description of the Related Art

When operating a gearshift in a vehicle with a manual transmission, first, a driver usually disengages a clutch. Thus, power transmission from a crankshaft of an engine to a main shaft of the transmission is stopped, so that gears are easily disconnected. In this state, the driver performs a shifting operation and changes gear positions. Finally, the driver engages the clutch, so that the power is transmitted from the crankshaft to the main shaft. In this manner, the gearshift is completed.

When the gearshift is required to be operated quickly in a race or other high speed activities, the driver operates the gearshift without a clutch operation (hereinafter referred to as "clutchless shifting") in some situations. In such situations, since the gearshift is operated while the power is being transmitted from the crankshaft to the main shaft, it is difficult to disconnect the gears.

Therefore, a system that adjusts an output of the engine such that the gears can be easily disconnected during the clutchless shifting has conventionally been developed (see JP 7-34916 A, for example).

For example, the output of the engine is adjusted when the shifting operation is performed by the driver in the transmission control system described in JP 7-34916 A. Thus, a torque of the engine applied to the gears of the transmission is reduced, so that the gears are easily disconnected.

Generally, the gears of the transmission provided in a vehicle such as a motorcycle, have a dog clutch mechanism. In such a transmission, it is not easy for a less skilled driver to quickly engage the gears. Therefore, an engagement failure of the gears may occur in the transmission to cause the gears to be maintained in a disconnected state in some cases when the driver operates the clutchless shifting.

Here, the gears can be easily disconnected according to the transmission control system described in JP 7-34916 A. However, the foregoing engagement failure of the gears cannot be sufficiently prevented. Therefore, when an accelerator operation is performed with the gears of the transmission being disconnected, the rotational speed of the engine may be changed.

In this case, a large difference arises between the rotational speed of the main shaft of the transmission and the rotational speed of the drive shaft, so that a shift shock may occur in the vehicle at the time of completion of the shifting operation. This negatively impacts a driving feeling of the vehicle.

SUMMARY OF THE INVENTION

In order to overcome the problems described above, preferred embodiments of the present invention provide a control system that enables comfortable driving of a saddle-straddling type vehicle and a saddle-straddling type vehicle including the same.

According to a preferred embodiment of the present invention, a control system that controls an engine of a saddle-straddling type vehicle includes a transmission that includes an input shaft to which rotation of the engine is transmitted and an output shaft to which rotation of the input shaft is transmitted, and an adjuster arranged to adjust a rotational speed of the engine such that the rotational speed of the engine is maintained in a target range when a separated state, in which the rotation of the input shaft is not transmitted to the output shaft, continues for a predetermined period of time or longer.

In the control system, the rotational speed of the engine is adjusted by the adjuster such that the rotational speed of the engine is maintained in the target range when the separated state, in which the rotation of the input shaft of the transmission is not transmitted to the output shaft, continues for the predetermined period of time or longer. Thus, variations in speed of the saddle-straddling type vehicle can be prevented and minimized when the transmission shifts to an engaged state where the rotation of the input shaft is transmitted to the output shaft. This prevents the occurrence of a shift shock in the saddle-straddling type vehicle. As a result, a driving feeling of the saddle-straddling type vehicle is improved.

In addition, since the rotational speed of the engine is maintained in the target range, increases in the rotational speed of the engine according to an accelerator opening can be prevented even when the driver performs a significant amount of operation on an accelerator by erroneously judging that a shift change has been finished. This prevents the occurrence of the shift shock, which is not expected by the driver, in the saddle-straddling type vehicle. As a result, the driving feeling of the saddle-straddling type vehicle is further improved.

The adjuster may adjust, when the separated state continues for the predetermined period of time or longer, the rotational speed of the engine such that the rotational speed of the engine is maintained in the target range until the separated state shifts to an engaged state where the rotation of the input shaft is transmitted to the output shaft.

In this case, the shift change can be reliably completed. This reliably improves the driving feeling of the saddle-straddling type vehicle.

The control system may further include an output shaft rotational speed detector arranged to detect information related to a rotational speed of the output shaft, a shift cam arranged to rotate according to a shifting operation by a driver, and a rotation angle detector arranged to detect a rotation angle of the shift cam, wherein the adjuster may set the target range based on results of detection by the output shaft rotational speed detector and the rotation angle detector.

In this case, the rotational speed of the engine is maintained in the appropriate target range according to a gear ratio of the transmission and a traveling speed of the saddle-straddling type vehicle. This further improves the driving feeling of the saddle-straddling type vehicle.

The transmission may transmit the rotation of the input shaft to the output shaft at a plurality of gear ratios including at least a first gear ratio and a second gear ratio that is smaller than the first gear ratio, and the target range may be a range that is smaller than a first engine rotational speed when the transmission is set at the first gear ratio and larger than a second engine rotational speed when the transmission is set at the second gear ratio.

In this case, the speed variation of the saddle-straddling type vehicle can be reduced when the transmission shifts from the separated state to the engaged state at the first gear ratio or the engaged state at the second gear ratio. This prevents the occurrence of the shift shock in the saddle-straddling type vehicle. As a result, the driving feeling of the saddle-straddling type vehicle is improved.

A lower limit of the target range may be a value obtained by adding a value of not less than about 30%, for example, of a difference between the first engine rotational speed and the second engine rotational speed to the second engine rotational speed, and an upper limit of the target range may be a value obtained by adding a value of not more than about 70%, for example, of the difference to the second engine rotational speed.

In this case, the speed variation of the saddle-straddling type vehicle can be reduced in both cases where the transmission shifts from the separated state to the engaged state at the first gear ratio and where the transmission shifts from the separated state to the engaged state at the second gear ratio. This prevents the occurrence of the shift shock in the saddle-straddling type vehicle. As a result, the driving feeling of the saddle-straddling type vehicle is improved.

A lower limit of the target range may be a value obtained by adding a value of not less than about 40%, for example, of a difference between the first engine rotational speed and the second engine rotational speed to the second engine rotational speed, and an upper limit of the target range may be a value obtained by adding a value of not more than about 60%, for example, of the difference to the second engine rotational speed.

In this case, significant speed variation of the saddle-straddling type vehicle can be reliably prevented in both cases where the transmission shifts from the separated state to the engaged state at the first gear ratio and where the transmission shifts from the separated state to the engaged state at the second gear ratio. This reliably prevents the occurrence of the shift shock in the saddle-straddling type vehicle. As a result, the driving feeling of the saddle-straddling type vehicle is sufficiently improved.

The control system may further include a shift cam that rotates according to a shifting operation by a driver, and a rotation angle detector arranged to detect a rotation angle of the shift cam, wherein the adjuster may determine the separated state based on the rotation angle of the shift cam detected by the rotation angle detector.

In this case, the separated state can be easily and reliably determined based on the rotation angle of the shift cam.

The control system may further include a shift cam that rotates according to a shifting operation by a driver, and a rotation angle detector arranged to detect a rotation angle of the shift cam, wherein the adjuster may determine the engaged state and the separated state based on the rotation angle of the shift cam detected by the rotation angle detector.

In this case, the engaged state and the separated state can be easily and reliably determined based on the rotation angle of the shift cam.

The control system may further include a vehicle speed detector arranged to detect information related to a traveling speed of the saddle-straddling type vehicle, wherein the adjuster may adjust the rotational speed of the engine such that the rotational speed of the engine is maintained in the target range when the information detected by the vehicle speed detector indicates a predetermined speed or higher and the separated state continues for the predetermined period of time or longer.

In this case, when the saddle-straddling type vehicle is stopped or driven at reduced speed, the rotational speed of the engine is not adjusted. This prevents the engine from being stopped.

According to another preferred embodiment of the present invention, a saddle-straddling type vehicle includes a drive wheel, an engine, a transmission that includes an input shaft to which rotation of the engine is transmitted and an output shaft to which rotation of the input shaft is transmitted, a transmission mechanism arranged to transmit rotation of the output shaft of the transmission to the drive wheel, and an adjuster arranged to adjust a rotational speed of the engine such that the rotational speed of the engine is maintained in a target range when a separated state where the rotation of the input shaft is not transmitted to the output shaft continues for a predetermined period of time or longer.

In the saddle-straddling type vehicle, the rotation of the engine is transmitted to the input shaft of the transmission, and the rotation of the input shaft of the transmission is transmitted to the output shaft. The rotation of the output shaft is transmitted to the drive wheel by the transmission mechanism.

In addition, the rotational speed of the engine is adjusted by the adjuster such that the rotational speed of the engine is maintained in the target range when the separated state where the rotation of the input shaft of the transmission is not transmitted to the output shaft continues for the predetermined period of time or longer in the saddle-straddling type vehicle. Thus, speed variation of the saddle-straddling type vehicle can be prevented and minimized when the transmission shifts to the engaged state where the rotation of the input shaft is transmitted to the output shaft. This prevents the occurrence of a shift shock in the saddle-straddling type vehicle. As a result, a driving feeling of the saddle-straddling type vehicle is improved.

In addition, since the rotational speed of the engine is maintained in the target range, an increase in the rotational speed of the engine according to an accelerator opening can be prevented even when the driver performs a significant amount of operation on an accelerator by erroneously judging that a shift change has been finished. This prevents occurrence of the shift shock, which is not expected by the driver, in the saddle-straddling type vehicle. As a result, the driving feeling of the saddle-straddling type vehicle is further improved.

Other features, elements, characteristics, and advantages of the present invention will become more apparent from the following description of preferred embodiments of the present invention with reference to the attached drawings.

BRIEF DESCRIPTION OF THE DRAWINGS

FIG. 8 is a diagram showing a relationship among a target rotational speed, a shift shock that occurs in the motorcycle, and an engaged state of the fixed gear and the sliding gear.

DETAILED DESCRIPTION OF THE PREFERRED EMBODIMENTS

A control system and a saddle-straddling type vehicle including the same according to preferred embodiments of the present invention will now be described with reference to the drawings. In the preferred embodiments, a motorcycle will be described as a non-limiting example of the saddle-straddling type vehicle.

(1) General Structure of Motorcycle

Figure 1:
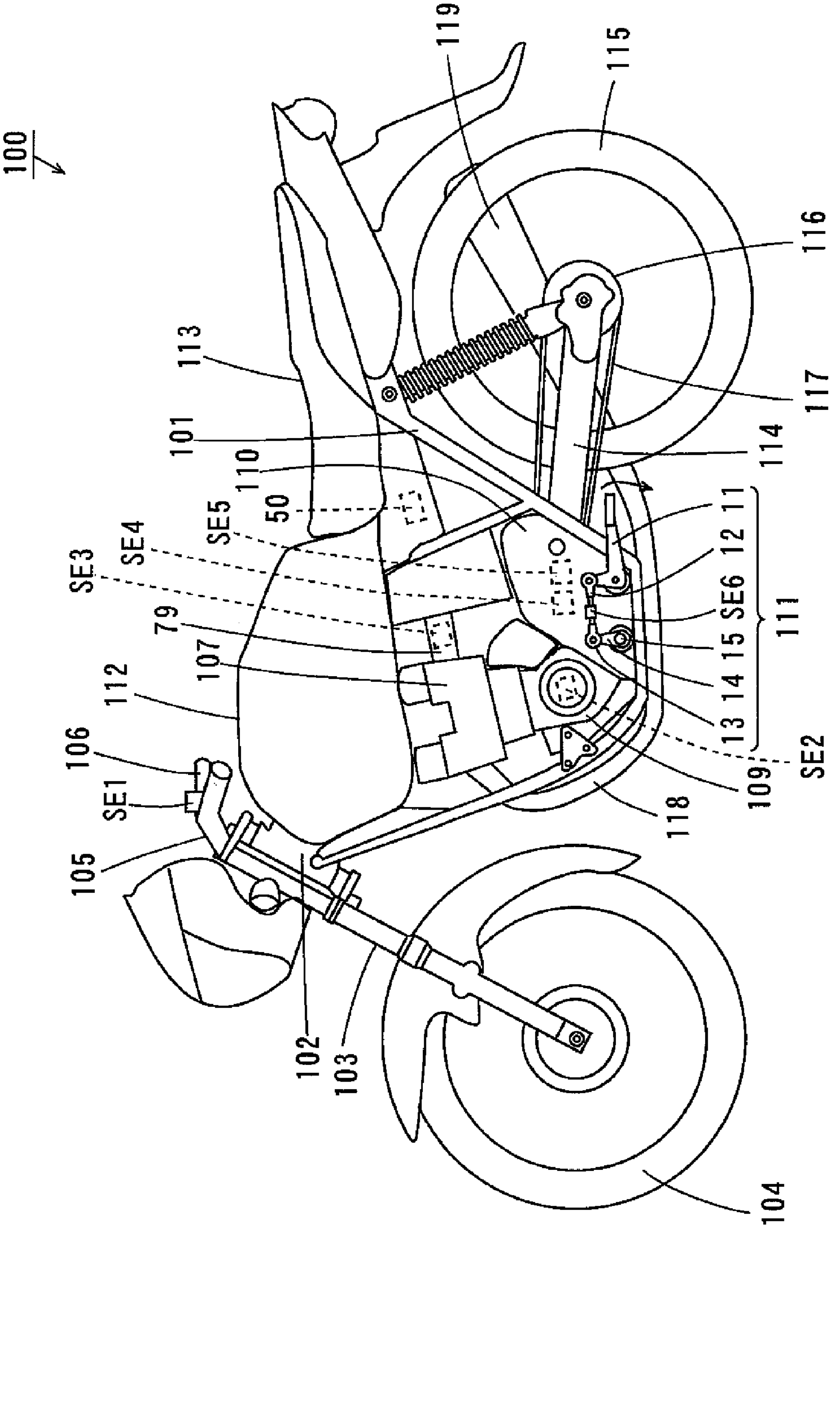
FIG. 1 is a schematic side view showing a motorcycle.

FIG. 1 is a schematic side view showing a motorcycle according to the present preferred embodiment.

In the motorcycle 100 of FIG. 1, ahead pipe 102 is provided at the front end of a main body frame 101. A front fork 103 is provided at the head pipe 102 so as to be able to swing from side to side. At the lower end of the front fork 103, a front wheel 104 is rotatably supported. A handle 105 is provided at the upper end of the head pipe 102.

The handle 105 is provided with an accelerator grip 106 and an accelerator opening sensor SE1. The accelerator opening sensor SE1 detects an operation amount of the accelerator grip 106 generated by a driver (hereinafter referred to as "an accelerator opening").

An engine 107 is provided at the center of the main body frame 101. An intake pipe 79 and an exhaust pipe 118 are attached to the engine 107. A crankcase 109 is attached to the lower portion of the engine 107. A crank angle sensor SE2 is provided in the crankcase 109. The crank angle sensor SE2 detects the rotation angle of a crank shaft 2, described below (see FIGS. 2 and 5), of the engine 107.

A throttle sensor SE3 is provided in the intake pipe 79. The throttle sensor SE3 detects the opening of an electronically controlled throttle valve (ETV) 82 (see FIG. 5), described below.

A transmission case 110 coupled to the crankcase 109 is provided at the lower portion of the main body frame 101. A shift cam rotation angle sensor SE4, a drive shaft rotational speed sensor SE5 as well as a transmission 5 (see FIG. 2) and a shift mechanism 7 (see FIG. 2), described below, are provided in the transmission case 110.

The shift cam rotation angle sensor SE4 detects the rotation angle of a shift cam 7*b* (see FIG. 2), described below. The drive shaft rotational speed sensor SE5 detects the rotational speed of a drive shaft 5*b* (see FIG. 2), described below. Details of the transmission 5 and the shift mechanism 7 will be described below.

A transmission operating mechanism 111 is provided on the side portion of the transmission case 110. The transmission operating mechanism 111 includes a shift pedal 11, a first coupling arm 12, a load sensor SE6, a second coupling arm 13, a pivot arm 14 and a pivot shaft 15. One end of the pivot shaft 15 is fixed to the pivot arm 14, and the other end thereof is coupled to the shift mechanism 7 (see FIG. 2), described below.

For example, when up-shifting the transmission 5, the driver depresses the shift pedal 11 to turn it in a clockwise direction (the direction indicated by the arrow in FIG. 1). Accordingly, the first and second coupling arms 12, 13 move towards the back of the motorcycle 100, and the pivot arm 14 and the pivot shaft 15 turn in the clockwise direction. As a result, the shift mechanism 7 is operated so that the transmission 5 is shifted up. Note that the shift pedal 11 is turned in a counterclockwise direction to shift down the transmission 5. Thus, the pivot shaft 15 is turned in the direction opposite to the direction described above (the counterclockwise direction). As a result, the shift mechanism 7 is operated, so that the transmission 5 is shifted down.

The load sensor SE6 preferably includes a load cell such as an elastic load cell (a strain gauge type, an electrostatic capacitance type or other suitable sensor device) or a magnetostrictive load cell, for example, and detects a tensile load and a compressive load acting on the load sensor SE6. When the driver turns the shift pedal 11 in the clockwise direction (an up-shifting operation), the tensile load acts on the load sensor SE6. When the driver turns the shift pedal 11 in the counterclockwise direction (a down-shifting operation), the compressive load acts on the load sensor SE6.

A fuel tank 112 is provided above the engine 107 and a seat 113 is provided to the rear of the fuel tank 112. An ECU (Electronic Control Unit) 50 is provided under the seat 113.

Figure 5:
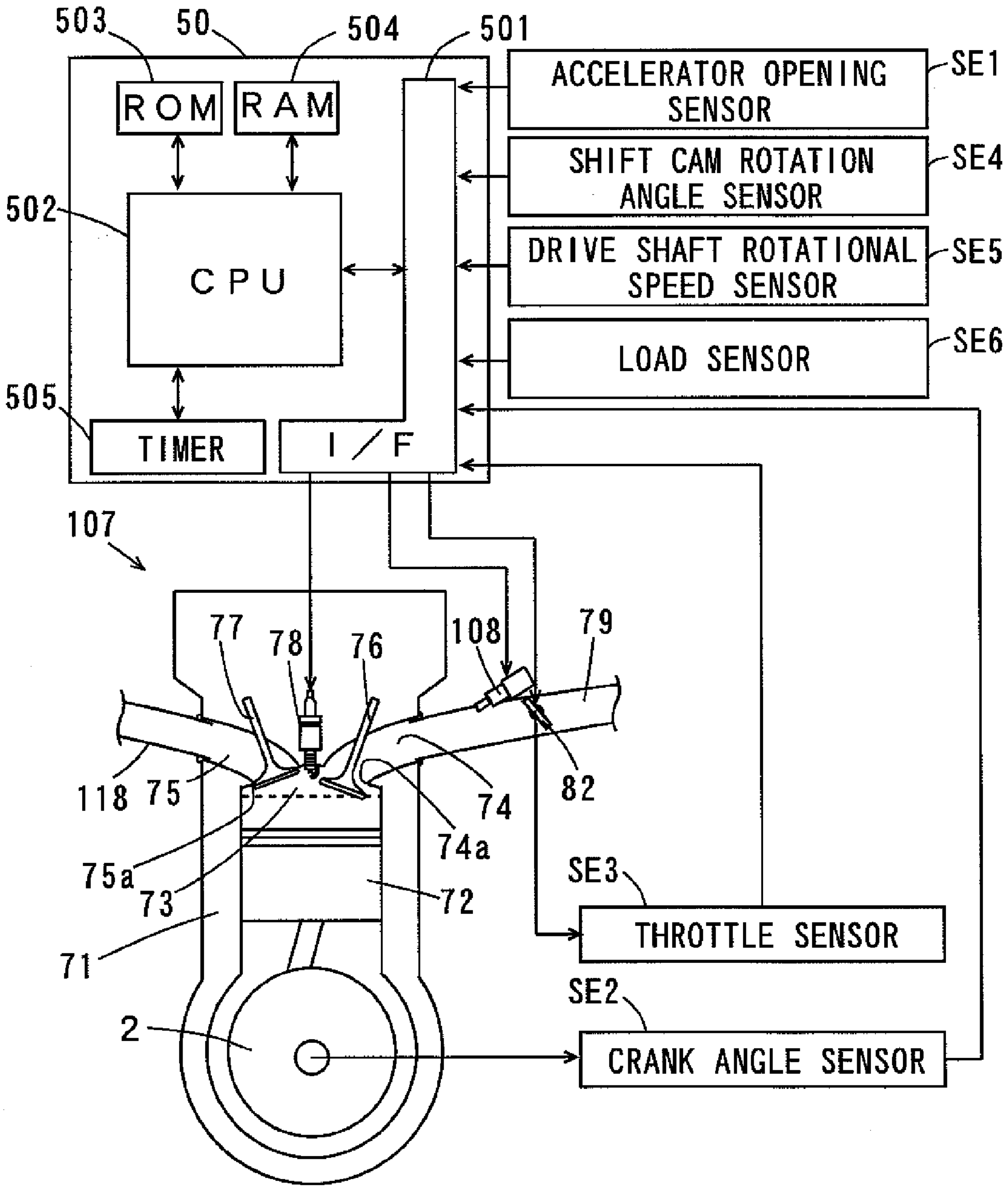
FIG. 5 is a diagram showing a schematic structure of an engine and each element related to a control of an output of the engine.

As seen in FIG. 5, the ECU 50 includes an I/F (interface) 501, a CPU (central processing unit) 502, a ROM (read only memory) 503, a RAM (random access memory) 504 and a timer 505. Values detected by the sensors SE1-SE6 are applied to the CPU 502 via the I/F 501.

The CPU 502 controls the operation of the engine 107 based on the values detected by the respective sensors SE1-SE6, as described below. The ROM 503 stores a control program for execution by the CPU 502 and so on. The RAM 504 functions as a work area for the CPU 502 while storing various data. The timer 505 measures time.

A rear arm 114 is connected to the main body frame 101 so as to extend to the rear of the engine 107. A rear wheel 115 and a rear wheel driven sprocket 116 are rotatably held by the rear arm 114. A chain 117 is attached to the rear wheel driven sprocket 116.

One end of an exhaust pipe 118 is attached to an exhaust port of the engine 107. The other end of the exhaust pipe 118 is attached to a muffler 119.

(2) Transmission Mechanism

Figure 2:
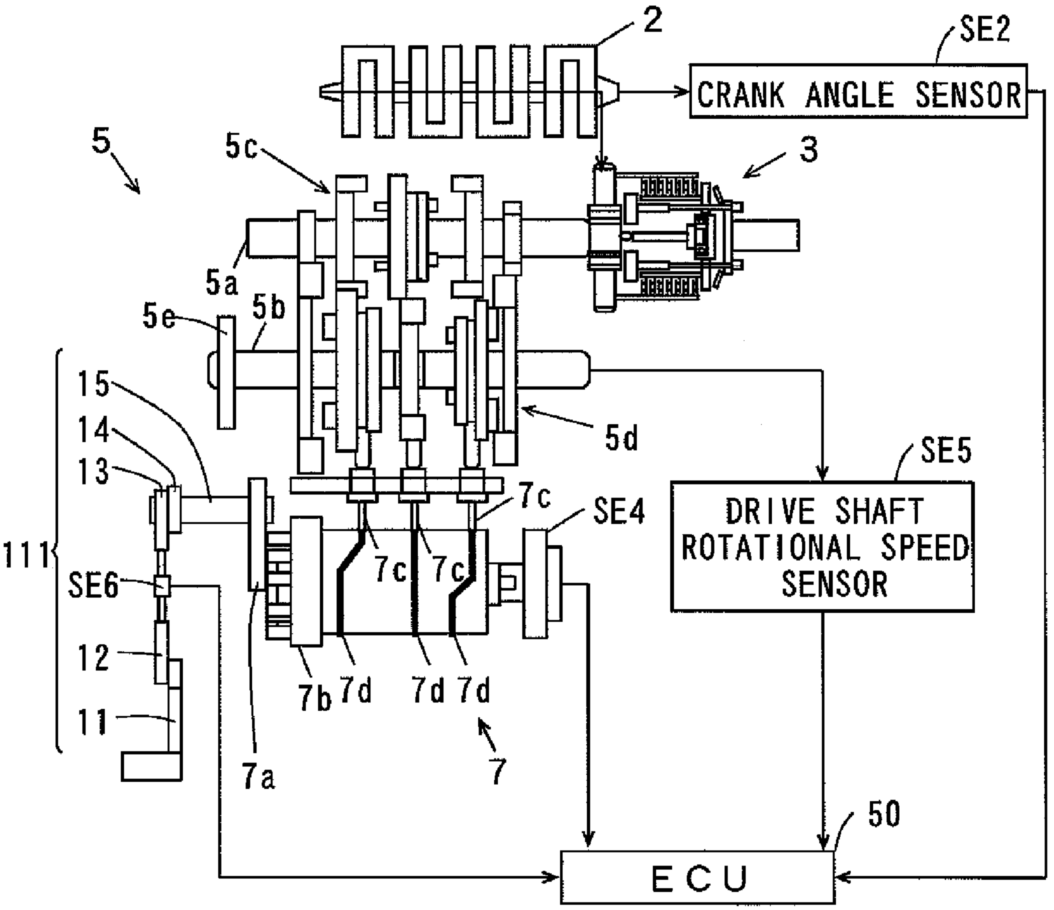
FIG. 2 is a diagram for explaining the structures of a transmission and a shift mechanism provided within a transmission case of FIG. 1.

FIG. 2 is a diagram explaining the structures of the transmission and the shift mechanism provided in the transmission case 110 of FIG. 1.

As shown in FIG. 2, the transmission 5 includes a main shaft 5*a* and the drive shaft 5*b*. A plurality of transmission gears 5*c* are mounted on the main shaft 5*a*, and a plurality of transmission gears 5*d* and a rear wheel drive sprocket 5*e* are mounted on the drive shaft 5*b*. The chain 117 of FIG. 1 is attached to the rear wheel drive sprocket 5*e*.

The torque (driving force) generated by the engine 107 of FIG. 1 is transmitted to a clutch 3 through the crank shaft 2 of FIG. 2. The torque transmitted to the clutch 3 is transmitted to the main shaft 5*a* of the transmission 5. The torque transmitted to the main shaft 5*a* is transmitted to the drive shaft 5*b* through the transmission gears 5*c*, 5*d*. The torque transmitted to the drive shaft 5*b* is transmitted to the rear wheel 115 (FIG. 1) through the rear wheel drive sprocket 5*e*, the chain 117 (FIG. 1) and the rear wheel driven sprocket 116 (FIG. 1). Accordingly, the rear wheel 115 is rotated.

Figure 3A:
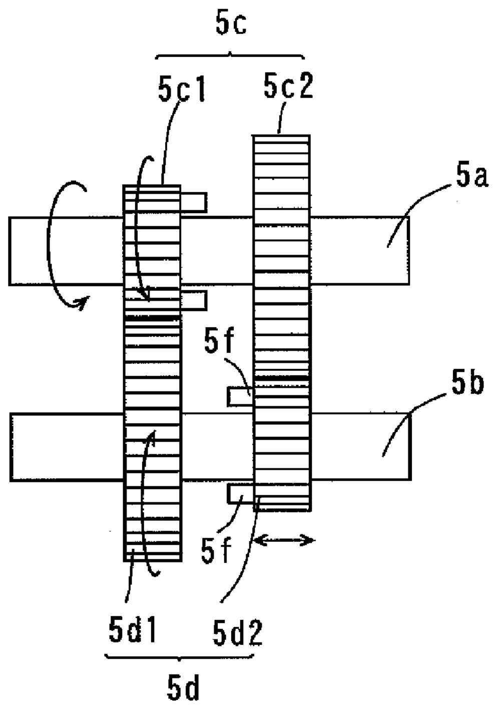
FIGS. 3A and 3B are schematic views showing a structure in which a torque transmitted to a main shaft is transmitted to a drive shaft.
Figure 3B:
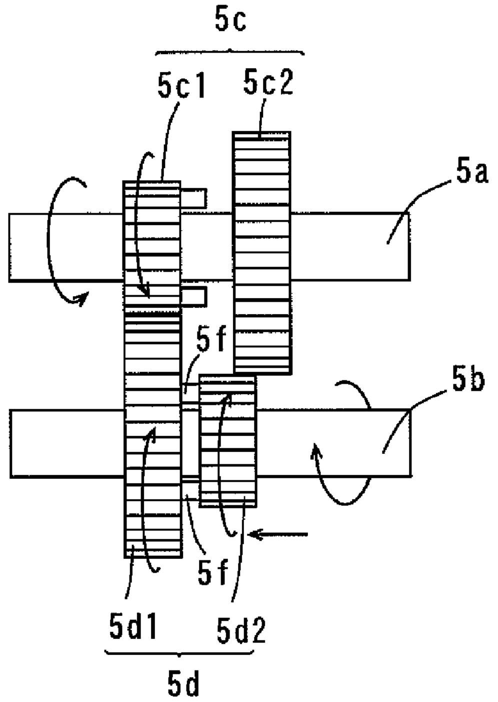

FIGS. 3A and 3B are schematic diagrams showing the structure in which the torque transmitted to the main shaft 5*a* is transmitted to the drive shaft 5*b*.

Note that transmission gears 5*c*1 and 5*c*2 of the plurality of transmission gears 5*c* and transmission gears 5*d*1 and 5*d*2 of the plurality of transmission gears 5*d* are shown in FIGS. 3A and 3B.

The transmission gear 5*c*1 is mounted on the main shaft 5*a* in a serration arrangement. That is, the transmission gear 5*c*1 is movable in the direction of the axis of the main shaft 5*a*, while being fixed to the main shaft 5*a* in the rotational direction of the main shaft 5*a*. Therefore, the rotation of the main shaft 5*a* causes the transmission gear 5*c*1 to rotate. The transmission gear 5*c*2 is rotatably mounted on the main shaft 5*a* while being prevented from moving in the direction of the axis of the main shaft 5*a*.

The transmission gear 5*d*1 is rotatably mounted on the drive shaft 5*b* while being prevented from moving in the direction of the axis of the drive shaft 5*b*. When the transmission gear 5*c*1 and the transmission gear 5*d*1 are engaged with each other, the rotation of the main shaft 5*a* causes the transmission gear 5*d*1 to rotate as shown in FIG. 3A.

The transmission gear 5*d*2 is mounted on the drive shaft 5*b* in the serration arrangement. That is, the transmission gear 5*d*2 is movable in the direction of the axis of the drive shaft 5*b* while being fixed to the drive shaft 5*b* in the rotational direction of the drive shaft 5*b*. Therefore, the rotation of the transmission gear 5*d*2 causes the drive shaft 5*b* to rotate.

As shown in FIG. 3A, when the transmission gear 5*d*2 is spaced apart from the transmission gear 5*d*1, the transmission gear 5*d*1 is not fixed to the drive shaft 5*b* in the rotational direction of the drive shaft 5*b*. In this case, the rotation of the main shaft 5*a* causes the transmission gear 5*d*1 to rotate, but does not cause the drive shaft 5*b* to rotate. This state where the torque (driving force) is not transmitted from the main shaft 5*a* to the drive shaft 5*b* is referred to as the state where the gears are in neutral positions.

As shown in FIG. 3B, the transmission gear 5*d*2 moves in the axial direction to be proximate to the transmission gear 5*d*1, so that convex-shaped dogs 5*f* provided on a side surface of the transmission gear 5*d*2 engage with concave-shaped dog holes (not shown) provided on a side surface of the transmission gear 5*d*1. In this manner, the transmission gears 5*d*1 and 5*d*2 are fixed to each other. In this case, the rotation of the main shaft 5*a* causes the transmission gear 5*d*2 to rotate together with the transmission gear 5*d*1. Accordingly, the drive shaft 5*b* is rotated.

Note that when the transmission gear 5*c*1 in the state of FIG. 3A is moved to be proximate to the transmission gear 5*c*2 to be fixed to the transmission gear 5*c*2, the transmission gear 5*c*2 rotates with the transmission gear 5*c*1. In this case, the transmission gear 5*d*2 is rotated in accordance with the rotation of the transmission gear 5*c*2. Thus, the drive shaft 5*b* is rotated. Hereinafter, transmission gears, such as the transmission gears 5*c*1, 5*d*2, which move in the axial direction on the main shaft 5*a* or the drive shaft 5*b*, will be referred to as sliding gears. In addition, transmission gears, such as the transmission gears 5*c*2, 5*d*1, which are prevented from moving in the direction of the axis of the main shaft 5*a* or the drive shaft 5*b*, will be referred to as fixed gears.

In the transmission 5, a transmission path of the torque (driving force) from the main shaft 5*a* to the drive shaft 5*b* can be changed by moving the sliding gears to change the combination of the sliding gears and the fixed gears, as described above. Thus, the rotational speed of the drive shaft 5*b* can be changed. Note that the sliding gears are moved by shift forks 7*c*, described below.

As shown in FIG. 2, the shift mechanism 7 includes a shift arm 7*a*, the shift cam 7*b* and the plurality of shift forks 7*c*. One end of the shift arm 7*a* is fixed to the pivot shaft 15 and the other end is coupled to one end of the shift cam 7*b*. A plurality of cam grooves 7*d* are formed in the shift cam 7*b*. The plurality of shift forks 7*c* are attached to the plurality of cam grooves 7*d*, respectively. The shift cam rotation angle sensor SE4 is provided at the other end of the shift cam 7*b*.

As described above, when the driver turns the shift pedal 11, the pivot shaft 15 is turned accordingly. With the pivot shaft 15 turned, the shift arm 7*a* is turned at one end as a central axis. This causes the shift cam 7*b* to turn.

The turn of the shift cam 7*b* causes the shift forks 7*c* to move along the cam grooves 7*d*, respectively. Accordingly, the sliding gears are moved, so that the transmission path of the torque (driving force) from the main shaft 5*a* to the drive shaft 5*b* is changed. That is, a gear ratio of the transmission 5 is changed.

(3) Relationship Between the Engine Output and the Transmission Gears

In general, when shifting the gears of the transmission 5 (hereinafter referred to as "the gearshift"), the driver operates a clutch lever (not shown) to disconnect the clutch 3 (FIG. 2). Thus, the transmission of the torque between the crank shaft 2 (FIG. 2) and the main shaft 5*a* is stopped. The driver operates the shift pedal 11 in this state (hereinafter referred to as "the shifting operation"). This enables the driver to smoothly operate the gearshift. The reason will be described with reference to the drawings.

As described above, the convex-shaped dogs are formed on the sliding gears of the plurality of transmission gears 5*c*, 5*d*, and the concave-shaped dog holes, with which the dogs are engaged are provided on the fixed gears of the plurality of transmission gears 5*c*, 5*d*.

Figure 4A:
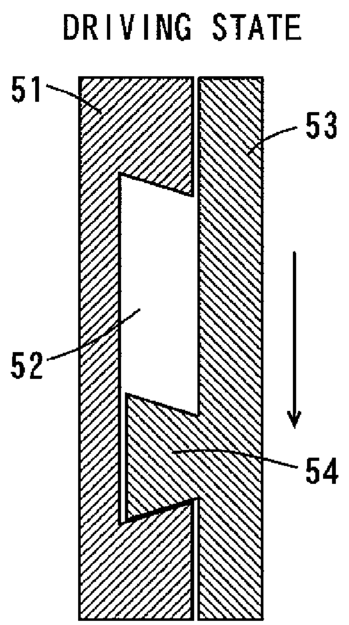
FIGS. 4A, 4B, and 4C are diagrams showing a relationship between a dog of a sliding gear and a dog hole of a fixed gear.
Figure 4B:
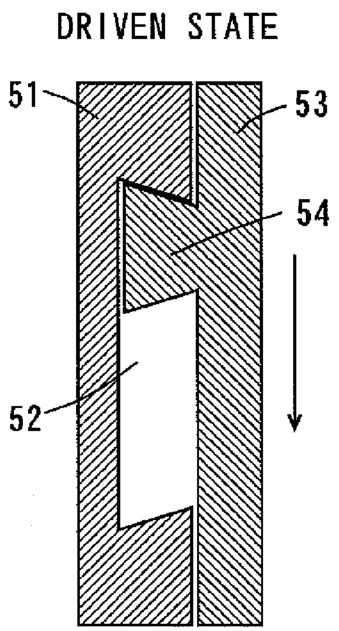
Figure 4C:
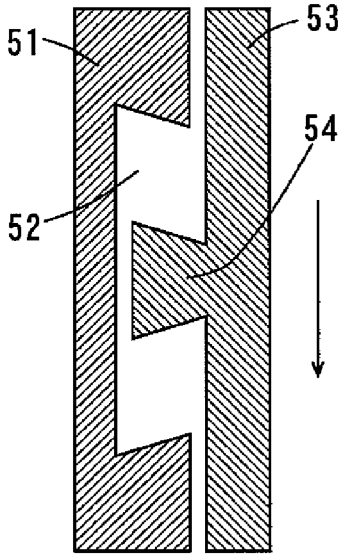

FIGS. 4A-4C are diagrams showing the relationship between a dog of a sliding gear and a dog hole of a fixed gear. Note that FIGS. 4A-4C schematically show sectional views of the portion in which the dog of the sliding gear and the dog hole of the fixed gear are formed. In addition, it is assumed that the portions of the sliding gear and the fixed gear shown in FIGS. 4A-4C will move (rotate) in the direction indicated by the arrow.

FIG. 4A shows a case in which the torque is applied from the crank shaft 2 (FIG. 2) to the main shaft 5*a* (FIG. 2), and FIG. 4B shows a case in which the torque is applied from the main shaft 5*a* to the crank shaft 2. Hereinafter, the case in which the torque is applied from the crank shaft 2 to the main shaft 5*a* (the state of FIG. 4A) is referred to as a driving state of the engine 107, and the opposite case (the state of FIG. 4B) is referred to as a driven state of the engine 107. For example, the engine 107 is in the driving state when the motorcycle 100 is accelerated, and the engine 107 is in the driven state when the motorcycle 100 is decelerated. That is, the driven state of the engine 107 is a state in which an engine brake is applied.

As shown in FIGS. 4A-4C, the dog hole 52 having a trapezoidal shape in cross section with its width increasing toward the bottom surface is formed on the fixed gear 51. Moreover, the dog 54 having an inverted trapezoidal shape in cross section with its width increasing toward a tip portion thereof is formed on the sliding gear 53.

In the driving state of the engine 107, a front side surface of the dog 54 in the moving direction thereof abuts against a front side surface of the dog hole 52 in the moving direction thereof, as shown in FIG. 4A. Accordingly, the torque of the sliding gear 53 is transmitted to the fixed gear 51 through the dog 54. In this case, a large pressure (engaging force) is generated in the contact surface of the dog hole 52 and the dog 54. Thus, it is difficult to move the sliding gear 53 in a direction away from the fixed gear 51.

Here, when the driver disengages the clutch 3 (FIG. 2), the transmission of the torque from the crank shaft 2 (FIG. 2) to the main shaft 5*a* (FIG. 2) is stopped. In this case, the main shaft 5*a* is rotated by inertia. Accordingly, the engagement of the dog hole 52 with the dog 54 is released as shown in FIG. 4C. This enables the sliding gear 53 to move in the direction away from the fixed gear 51, so that the gearshift can be smoothly performed.

Furthermore, in the driven state of the engine 107, a rear side surface of the dog 54 in the moving direction thereof abuts against a rear side surface of the dog hole 52 in the moving direction thereof, as shown in FIG. 4B. Accordingly, the torque of the fixed gear 51 is transmitted to the sliding gear 53 through the dog 54. As described above, since the engine brake is applied in the driven state of the engine 107, the rotation of the fixed gear 51 is prevented by the sliding gear

53. In this case, the large pressure (engaging force) is generated in the contact surface of the dog hole 52 and the dog 54. Thus, it is difficult to move the sliding gear 53 in the direction away from the fixed gear 51.

Here, when the driver disconnects the clutch 3 (FIG. 2), the transmission of the torque between the crank shaft 2 (FIG. 2) and the main shaft 5*a* (FIG. 2) is stopped. In this case, the engine brake is released, so that the main shaft 5*a* is rotated by inertia. Thus, the engagement of the dog hole 52 with the dog 54 is released as shown in FIG. 4C. This enables the sliding gear 53 to move in the direction away from the fixed gear 51, so that the gearshift can be smoothly performed.

(4) Control of the Output of the Engine

In the present preferred embodiment, the CPU 502 of the ECU 50 (FIG. 5) adjusts the output and the rotational speed of the engine 107 based on the values detected by the above-mentioned sensors SE1-SE6. Thus, the driver can smoothly operate the gearshift without disconnecting the clutch 3 (FIG. 2). That is, the clutchless shifting can be smoothly performed. Details will now be described.

(4-1) Relationship Between the Engine and Each Element

FIG. 5 is a diagram showing a schematic structure of the engine 107 and each element related to the control of the output of the engine 107.

As shown in FIG. 5, the engine 107 includes a cylinder 71, in which a piston 72 is provided so as to be able to move up and down. In addition, a combustion chamber 73 is formed in the upper portion inside the cylinder 71. The combustion chamber 73 communicates with the outside of the engine 107 through an intake port 74 and an exhaust port 75.

An intake valve 76 capable of opening and closing is provided at a downstream open end 74*a* of the intake port 74, and an exhaust valve 77 capable of opening and closing is provided at an upstream open end 75*a* of the exhaust port 75. The intake valve 76 and the exhaust valve 77 are driven by a conventional cam mechanism. Above the combustion chamber 73, an ignition plug 78 is provided to perform a spark ignition in the combustion chamber 73.

The intake pipe 79 and the exhaust pipe 118 are attached to the engine 107 so as to communicate with the intake port 74 and the exhaust port 75, respectively. The injector 108 for supplying a fuel into the cylinder 71 is provided in the intake pipe 79. In addition, the electronically controlled throttle valve (ETV) 82 is provided in the intake pipe 79.

In the actuation of the engine 107, air is taken from the intake port 74 into the combustion chamber 73 through the intake pipe 79 while the fuel is supplied into the combustion chamber 73 by the injector 108. Accordingly, an air-fuel mixture is produced in the combustion chamber 73, and the spark ignition is performed on the air-fuel mixture by the ignition plug 78. Burned gas produced by the combustion of the air-fuel mixture in the combustion chamber 73 is exhausted from the exhaust port 75 through the exhaust pipe 118.

The values detected by the accelerator opening sensor SE1, the crank angle sensor SE2, the throttle sensor SE3, the shift cam rotation angle sensor SE4, the drive shaft rotational speed sensor SE5 and the load sensor SE6 are supplied to the ECU 50.

(4-2) Control Operation of the CPU (a) Outline

In the present preferred embodiment, the CPU 502 of the ECU 50 (FIG. 5) adjusts a throttle opening of the ETV 82 based on the value detected by the accelerator opening sensor SE1 in a normal operation. Thus, the output of the engine 107 is adjusted to be a value depending on the accelerator opening. Note that the relationship between the accelerator opening and the throttle opening (the output of the engine) is preferably stored in the ROM 503 or the RAM 504 of FIG. 5.

Moreover, the CPU 502 detects the shifting operation by the driver based on the value detected by the load sensor SE6. Then, the CPU 502 adjusts the output of the engine 107 when the shifting operation by the driver is detected.

In addition, the CPU 502 adjusts the rotational speed of the engine 107 when the sliding gear and the fixed gear are not engaged with each other after an elapse of the predetermined period of time since the shifting operation by the driver has been detected.

Note that the CPU 502 decreases the output or the rotational speed of the engine 107 by, for example, stopping the spark ignition of the air-fuel mixture performed by the ignition plug 78 (FIG. 5), retarding an ignition timing, or decreasing a throttle opening of the ETV 82 (FIG. 5). Furthermore, the CPU 502 increases the output or the rotational speed of the engine 107 by, for example, increasing the throttle opening of the ETV 82.

(b) Control Flow

Hereinafter, details of the control of the output and the rotational speed of the engine 107 by the CPU 502 will be described.

Figure 6:
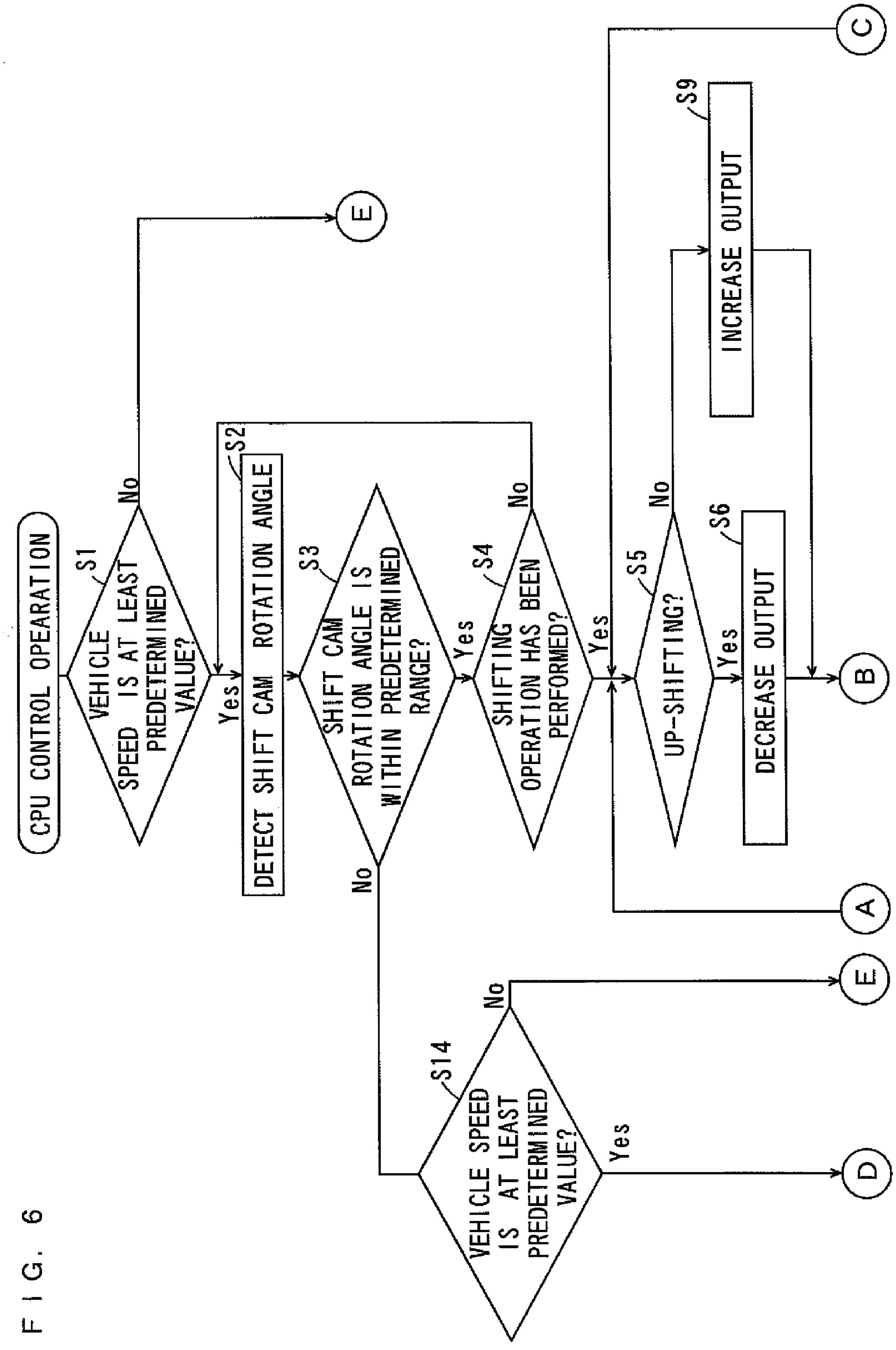
FIG. 6 is a flowchart showing a control operation of a CPU.
Figure 7:
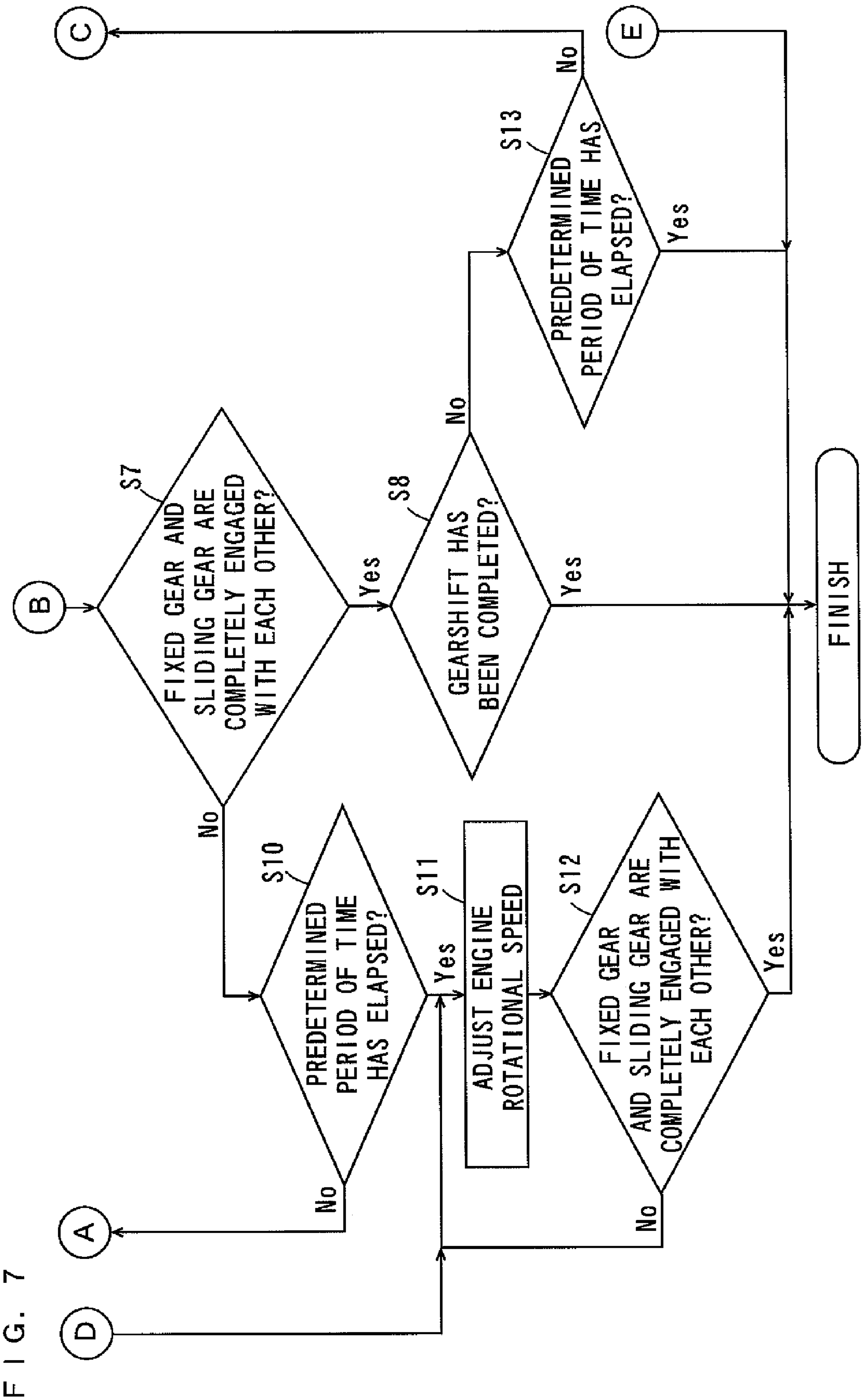
FIG. 7 is a flowchart showing the control operation of the CPU.

FIGS. 6 and 7 are flowcharts showing the control operation of the CPU 502.

As shown in FIG. 6, first, the CPU 502 determines whether or not the traveling speed of the motorcycle 100 is at least a predetermined value based on the value detected by the drive shaft rotational speed sensor SE5 (Step S1). The predetermined value may preferably be 15 km/h, for example. When the traveling speed of the motorcycle 100 is lower than the predetermined value, the CPU 502 finishes the control operation.

When the traveling speed of the motorcycle 100 is at least the predetermined value, the CPU 502 determines whether or not the rotation angle of the shift cam 7*b* is within a predetermined range based on the value detected by the shift cam rotation angle sensor SE4 (Steps S2, S3). Here, the predetermined range is a range of the rotation angle of the shift cam 7*b* when the fixed gear 51 and the sliding gear 53 of the transmission 5 are engaged with each other (that is, when the transmission 5 is in the engaged state).

When the rotation angle of the shift cam 7*b* is within the predetermined range (that is, when the transmission 5 is in the engaged state), the CPU 502 determines based on the value detected by the load sensor SE6 (FIG. 2) whether or not the shifting operation has been performed by the driver (Step S4). In Step S4, the CPU 502 determines that the shifting operation has been performed by the driver when an absolute value of the value detected by the load sensor SE6 exceeds a predetermined threshold value for a predetermined period of time or longer. The above-mentioned threshold value is preset based on the structure of the transmission operating mechanism 111 (FIG. 2) and so on, and is stored in the RAM 504 (FIG. 5). The period of time for which the absolute value of the value detected by the load sensor SE6 exceeds the threshold value is measured by the timer 505 (FIG. 5). Time is measured by the timer 505 also in Steps S7 and S10 (FIG. 7), described below.

When the shifting operation is performed by the driver, the CPU 502 determines whether or not the shifting operation is the up-shifting operation (Step S5). In Step S5, the CPU 502 determines that the up-shifting operation has been performed by the driver when the value detected by the load sensor SE6 is a positive value, and determines that the down-shifting operation has been performed by the driver when the value detected by the load sensor SE6 is a negative value.

When the up-shifting operation has been performed by the driver, the CPU 502 decreases the output of the engine 107 (Step S6). Specifically, the output of the engine 107 is set lower than a value determined based on the accelerator opening. The output of the engine 107 is decreased in the process of Step S6, so that an engaging force of the fixed gear 51 with the sliding gear 53 is decreased. This allows the fixed gear 51 and the sliding gear 53 to be brought into the state shown in FIG. 4C. As a result, the driver can easily release the engagement of the fixed gear 51 with the sliding gear 53.

As shown in FIG. 7, the CPU 502 subsequently determines whether or not the fixed gear 51 and the sliding gear 53 are completely engaged with each other (Step S7). In Step S7, the CPU 502 determines the engaged state of the fixed gear 51 with the sliding gear 53 based on the value detected by the shift cam rotation angle sensor SE4. Specifically, the CPU 502 determines that the fixed gear 51 and the sliding gear 53 are completely engaged with each other when the value detected by the shift cam rotation angle sensor SE4 agrees with the shift cam rotation angle in the state where the transmission 5 is set at any of shift positions.

When the fixed gear 51 and the sliding gear 53 are engaged with each other, the CPU 502 determines whether or not the gearshift has been completed (Step S8). Specifically, the CPU 502 determines whether or not the gearshift of the transmission 5 has been completed based on the value detected by the shift cam rotation angle sensor SE4. When the gearshift has been completed, the CPU 502 finishes the control operation.

When it is determined that the shifting operation has not been performed by the driver in Step S4 of FIG. 6, the CPU 502 returns to the process of Step S2.

When it is determined that the down-shifting operation has been performed by the driver in Step S5, the CPU 502 increases the output of the engine 107 (Step S9). Specifically, the output of the engine 107 is set higher than the value determined based on the accelerator opening. The output of the engine 107 is increased in the process of Step S9, so that the engaging force of the fixed gear 51 with the sliding gear 53 is decreased. This allows the fixed gear 51 and the sliding gear 53 to be brought into the state shown in FIG. 4C. As a result, the driver can easily release the engagement of the fixed gear 51 with the sliding gear 53.

When it is determined that the engagement of the fixed gear 51 with the sliding gear 53 is not completed in Step S7 of FIG. 7, the CPU 502 determines whether or not a predetermined period of time (about 160 msec, for example) has elapsed since the shifting operation by the driver was detected in Step S4 (Step S10).

When it is determined that the predetermined period of time has elapsed since the shifting operation by the driver was detected, the CPU 502 adjusts the rotational speed of the engine 107 (Step S1). Specifically, the CPU 502 calculates a target range by the following method, and controls the ETV 82 (FIG. 5) and the injector 108 (FIG. 5) and so on such that the rotational speed of the engine 107 is maintained within the target range. Note that such a case that the fixed gear 51 and the sliding gear 53 are not engaged with each other even after an elapse of a predetermined period of time is referred to as a shifting error in the following description. In addition, the state of the motorcycle 100 when the shifting error is occurring is referred to as a shifting error state. The target range is a range from the lower limit of the target range to the upper limit of the target range.

The lower limit of the target range=upper position side estimated rotational speed+((lower position side estimated rotational speed)−(upper position side estimated rotational speed))×A (1a)

The upper limit of the target range=upper position side estimated rotational speed+((lower position side estimated rotational speed)−(upper position side estimated rotational speed))×B (1b)

The coefficient A in the foregoing equation (1a) is a value larger than zero and smaller than one, and the coefficient B in the foregoing equation (1b) is a value larger than zero and smaller than one and not less than A.

The upper position side estimated rotational speed in the foregoing equations (1a), (1b) is a rotational speed of the engine 107 with which the speed of the motorcycle 100 in the shifting error state can be maintained, assuming that the gear position of the transmission 5 in the shifting error state is set at the upper position (higher speed) side.

For example, when the shifting error occurs at the time of shift change of the gear position of the transmission 5 from the first position to the second position or from the second position to the first position, the rotational speed of the engine 107 with which the speed of the motorcycle 100 in the shifting error state can be maintained and the gear position of the transmission 5 can be set at the second position is the upper position side estimated rotational speed.

Similarly, the lower position side estimated rotational speed in the foregoing equations (1a), (1b) is a rotational speed of the engine 107 with which the speed of the motorcycle 100 in the shifting error state can be maintained, assuming that the gear position of the transmission 5 is set at the lower position (lower speed) side.

For example, when the shifting error occurs at the time of the shift change of the gear position of the transmission 5 from the first position to the second position or from the second position to the first position, the rotational speed of the engine 107 with which the speed of the motorcycle 100 in the shifting error state can be maintained and the gear position of the transmission 5 can be set at the first position is the lower position side estimated rotational speed.

The upper position side estimated rotational speed is calculated by the CPU 502 using the following equation (2). The lower position side estimated rotational speed is calculated by the CPU 502 using the following equation (3).

Upper position side estimated rotational speed=drive shaft rotational speed×upper position side gear ratio×primary reduction gear ratio (2)

Lower position side estimated rotational speed=drive shaft rotational speed×lower position side gear ratio×primary reduction gear ratio (3)

The drive shaft rotational speed in the foregoing equations (2), (3) is detected by the drive shaft rotational speed sensor SE5 (FIG. 5). The upper position side gear ratio in the foregoing equation (2) is the gear ratio of the transmission 5 when the gear position is set at the upper position side. For example, when the shifting error occurs at the time of the shift change of the gear position of the transmission 5 from the first position to the second position or from the second position to the first position, the gear ratio of the transmission 5 in the second position is the upper position side gear ratio. The primary reduction gear ratio is a reduction gear ratio between the main shaft 5*a* (FIG. 2) and the crank shaft 2 (FIG. 2).

Similarly, the lower position side gear ratio in the foregoing equation (3) is the gear ratio of the transmission 5 when the gear position is set at the lower position side. For example, when the shifting error occurs at the time of the shift change of the gear position of the transmission 5 from the first position to the second position or from the second position to the first position, the gear ratio of the transmission 5 in the first position is the lower position side gear ratio.

In this manner, the target range is set to the predetermined range between the upper position side estimated rotational speed and the lower position side estimated rotational speed.

The lower limit of the target range is preferably a value obtained by adding a value of not less than about 30%, for example, of a difference between the lower position side estimated rotational speed and the upper position side estimated rotational speed (hereinafter simply abbreviated as a difference) to the upper position side estimated rotational speed, and the upper limit of the target range is preferably a value obtained by adding a value of not less than about 60%, for example, of the foregoing difference to the upper position side estimated rotational speed, as will be described below.

Moreover, the lower limit of the target range is more preferably a value obtained by adding a value of not less than about 40%, for example, of the foregoing difference to the upper position side estimated rotational speed, and the upper limit of the target range is more preferably a value obtained by adding a value of not less than about 70%, for example, of the foregoing difference to the upper position side estimated rotational speed.

That is, the coefficient A in the foregoing equation (1a) is preferably not less than about 0.30, and the coefficient B in the foregoing equation (1b) is preferably not more than about 0.70, for example. Furthermore, the coefficient A in the foregoing equation (1a) is more preferably not less than about 0.40, and the coefficient B in the foregoing equation (1b) is more preferably not more than about 0.60, for example.

For example, both the coefficient A and the coefficient B may be about 0.5. In this case, the rotational speed of the engine 107 is maintained at an intermediate value between the lower position side estimated rotational speed and the upper position side estimated rotational speed. The rotational speed of the engine 107 may be maintained at another value between the lower position side estimated rotational speed and the upper position side estimated rotational speed.

Next, the CPU 502 determines whether or not the fixed gear 51 and the sliding gear 53 are completely engaged with each other, similarly to Step S7 (Step S12). When the fixed gear 51 and the sliding gear 53 are completely engaged with each other, the CPU 502 finishes the control operation.

When the fixed gear 51 and the sliding gear 53 are not completely engaged with each other in Step S12, the CPU 502 repeats the processes of Steps S11 and S12 until the fixed gear 51 and the sliding gear 53 are completely engaged with each other. The process of Step S12 is provided, so that the shift change can be reliably completed.

Note that the predetermined range between the upper position side estimated rotational speed and the lower position side estimated rotational speed is calculated as the target range as shown in the foregoing equations (1a), (1b) in the present preferred embodiment. Accordingly, significant variation in the speed of the motorcycle 100 can be prevented in both cases where the gear position of the transmission 5 is set at the upper position side and where the gear position of the transmission 5 is set at the lower position side after occurrence of the shifting error. This prevents occurrence of a shift shock and improves the driving feeling of the motorcycle 100.

When it is determined that the predetermined period of time has not elapsed in Step S10, the CPU 502 returns to the process of Step S5 of FIG. 6.

When it is determined that the gearshift has not been completed in Step S8 of FIG. 7, that is, when the fixed gear 51 and the sliding gear 53 are completely engaged with each other without change of the gear position of the transmission 5, the CPU 502 determines whether or not a predetermined period of time (about 200 msec, for example) has elapsed since the shifting operation by the driver was detected in Step S4 (Step S13).

When the predetermined period of time has elapsed, the CPU 502 finishes the control operation. When the predetermined period of time has not elapsed in Step S13, the CPU 502 returns to the process of Step S5 of FIG. 6.

When the rotation angle of the shift cam 7*b* is not within the predetermined range (that is, when the transmission 5 is in the separated state) in Step S3, the CPU 502 determines whether or not the traveling speed of the motorcycle 100 is at least the predetermined value based on the value detected by the drive shaft rotational speed sensor SE5 (Step S14). The predetermined value preferably may be about 15 km/h, for example. When the traveling speed of the motorcycle 100 is lower than the predetermined value, the CPU 502 finishes the control operation.

When the traveling speed of the motorcycle 100 is at least the predetermined value, the CPU 502 proceeds to the process of Step S11.

(5) Effects

In this manner, the output of the engine 107 is decreased or increased by the CPU 502 when the driver performs the up-shifting operation or the down-shifting operation in the present preferred embodiment. This decreases the engaging force between the fixed gear 51 and the sliding gear 53 so that the driver can smoothly perform clutchless shifting.

When a shifting error occurs in the transmission 5, the rotational speed of the engine 107 is adjusted by the CPU 502. Specifically, the rotational speed of the engine 107 is adjusted such that the speed variation of the motorcycle 100 is reduced in both cases where the gear position of the transmission 5 is set at the upper position side and where the gear position of the transmission 5 is set at the lower position side after occurrence of the shifting error. This prevents occurrence of the shift shock in the motorcycle 100. As a result, the driving feeling of the motorcycle 100 is improved.

In addition, since the rotational speed of the engine 107 is maintained within the target range, an increase in the rotational speed of the engine 107 according to the accelerator opening can be prevented even when the driver performs a significant amount of operation on an accelerator by erroneously judging that the shift change has been finished. This prevents occurrence of the shift shock, which is not expected by the driver, in the motorcycle 100. As a result, the driving feeling of the motorcycle 100 is further improved.

Furthermore, the adjustment of the rotational speed of the engine 107 is not performed when the motorcycle 100 is stopped or driven at reduced speed. This prevents the engine 107 from being stopped when the motorcycle 100 is stopped or driven at reduced speed.

(6) Modifications

While the output of the engine 107 preferably is decreased when the up-shifting operation of the transmission 5 is performed by the driver, and the output of the engine 107 is increased when the down-shifting operation of the transmission 5 is performed by the driver in the above-described preferred embodiment, the method of adjusting the output of the engine 107 is not limited to the foregoing example.

For example, a torque sensor may be provided in the transmission 5 or the engine 107 to perform the output adjustment of the engine 107 based on a value detected by the torque sensor. The output of the engine 107 may be decreased when the torque is transmitted from the engine 107 to the transmission 5, and the output of the engine 107 may be increased when the torque is transmitted from the transmission 5 to the engine 107, for example.

While the target range preferably is calculated by the CPU 502 in the above-described preferred embodiment, a target range determined based on the drive shaft rotational speed and the gear position may be stored in the RAM 504 in advance.

While the shifting operation by the driver preferably is detected using the load sensor SE6 in the above-described preferred embodiment, the present invention is not limited to this. For example, the shifting operation by the driver may be detected using a load switch, or the shifting operation by the driver may be detected based on a displacement amount of a predetermined member of the transmission operating mechanism 111.

Furthermore, while it is preferably determined whether or not the fixed gear 51 and the sliding gear 53 are completely engaged with each other using the value detected by the shift cam rotation angle detection sensor SE4 in the above-described preferred embodiment, the present invention is not limited to this. For example, switches that are individually turned on or off depending on the rotation angle of the shift cam 7*b* may be provided in respective gear positions to determine whether or not the fixed gear 51 and the sliding gear 53 are completely engaged with each other based on states of those switches.

In addition, while the upper position side estimated rotational speed and the lower position side estimated rotational speed are preferably calculated using the drive shaft rotational speed detected by the drive shaft rotational speed sensor SE5 in the above-described preferred embodiment, the present invention is not limited to this. For example, a wheel shaft rotational speed sensor that detects a rotational speed of the front wheel 104 or the rear wheel 115 may be provided to calculate the upper position side estimated rotational speed and the lower position side estimated rotational speed using a value detected by the wheel shaft rotational speed sensor since the rotational speed of the front wheel 104 or the rear wheel 115 is substantially the same as the rotational speed of the drive shaft 5*b*.

While the traveling speed of the motorcycle 100 preferably is calculated using the value detected by the drive shaft rotational speed sensor SE5 in the above-described preferred embodiment, the present invention is not limited to this. For example, the wheel shaft rotational speed sensor that detects the rotational speed of the front wheel 104 or the rear wheel 115 may be provided to calculate the traveling speed of the motorcycle 100 using the value detected by the wheel shaft rotational speed sensor.

As described above, as the lower limit of the target range, the value obtained by adding the value of not less than about 30%, for example, of the foregoing difference to the upper position side estimated rotational speed is preferably used, and the value obtained by adding the value of not less than about 40%, for example, of the foregoing difference to the upper position side estimated rotational speed is more preferably used. Moreover, as the upper limit of the target range, the value obtained by adding the value of not less than about 70%, for example, of the foregoing difference to the upper position side estimated rotational speed may be preferably used, and the value obtained by adding the value of not less than about 60%, for example, of the foregoing difference to the upper position side estimated rotational speed is more preferably used. The ground for this will be described.

FIG. 8 is a diagram showing a relationship among the target rotational speed, the shift shock that occurs in the motorcycle 100 and the engaged state of the fixed gear 51 and the sliding gear 53. Note that FIG. 8 shows results obtained from an experiment.

Numeric values displayed in the columns of the target rotational speed of FIG. 8 indicate ratios of the difference (the difference between the lower position side estimated rotational speed and the upper position side estimated rotational speed) added to the upper position side estimated rotational speed.

"○" shown in the columns of the shift shock of FIG. 8 indicates that a shock of not less than about 0.1 G (acceleration of gravity) has not occurred in the motorcycle 100 when the gear position of the transmission 5 in the shifting error state was set at the upper position side or the lower position side.

"Δ" shown in the columns of the shift shock of FIG. 8 indicates that a shock of not less than about 0.1 G and less than about 0.15 G has occurred in the motorcycle 100 when the gear position of the transmission 5 in the shifting error state was set at the upper position side or the lower position side.

"X" shown in the columns of the shift shock of FIG. 8 indicates that a shock of not less than about 0.15 G has occurred in the motorcycle 100 when the gear position of the transmission 5 in the shifting error state was set at the upper position side or the lower position side.

In addition, "○" shown in the columns of the engaged state of FIG. 8 indicates that when an experiment in which the gear position of the transmission 5 in the shifting error state was set at the upper position side or the lower position side was repeated 10,000 times for each target rotational speed, the fixed gear 51 (FIG. 4) and the sliding gear 53 (FIG. 4) were completely engaged with each other within 100 msec in all the experiments conducted 10,000 times.

"Δ" shown in the columns of the engaged state of FIG. 8 indicates that it took not less than about 100 msec and less than about 150 msec until the fixed gear 51 and the sliding gear 53 were completely engaged with each other twice or more in the foregoing experiments. Note that in the case of "Δ", it did not take 150 msec or longer until the fixed gear 51 and the sliding gear 53 were completely engaged with each other.

"X" shown in the columns of the engaged state of FIG. 8 indicates that it took not less than about 150 msec until the fixed gear 51 and the sliding gear 53 were completely engaged with each other twice or more in the foregoing experiments.

As shown in FIG. 8, when the value obtained by adding the value of about 30% to about 70% of the difference to the upper position side estimated rotational speed was used as the target rotational speed, the shift shock less frequently occurred in the motorcycle 100 and the engaged state of the fixed gear 51 with the sliding gear 53 was excellent.

Moreover, when the value obtained by adding the value of about 40% to about 60% of the difference to the upper position side estimated rotational speed was used as the target rotational speed, the shift shock further less frequently occurred in the motorcycle 100 and the engaged state of the fixed gear 51 with the sliding gear 53 was even more excellent.

As a result, for the target range, the range obtained by adding the range of about 30% to about 70% of the difference to the upper position side estimated rotational speed is preferably used, and the range obtained by adding the range of about 40% to about 60% of the difference to the upper position side estimated rotational speed is more preferably used.

Note that a three-axis acceleration sensor (AS-100TA) was attached to the motorcycle 100 to measure variation in the acceleration of gravity at the time of speed change, so that the shift shock was detected.

Furthermore, while the foregoing preferred embodiments have described an application of the present invention to a motorcycle as an example of the saddle-straddling type vehicle, the present invention is similarly applicable also to other types of saddle-straddling type vehicles that a rider drives while straddling a seat, such as three-wheelers and buggy-type four-wheelers.

(7) Correspondences Between Elements in the Claims and Elements in Embodiments

In the following paragraph, non-limiting examples of correspondences between various elements recited in the claims below and those described above with respect to various preferred embodiments of the present invention are explained.

In the above-described preferred embodiments, the CPU 502 is an example of an adjuster, the main shaft 5*a* is an example of an input shaft, the drive shaft 5*b* is an example of an output shaft, the drive shaft rotational speed sensor SE5 is an example of an output shaft rotational speed detector and a vehicle speed detector, the shift cam rotation angle sensor SE4 is an example of a rotation angle detector, the lower position side estimated rotational speed is an example of a first rotational speed, the upper position side estimated rotational speed is an example of a second rotational speed, the rear wheel 115 is an example of a drive wheel, the rear wheel drive sprocket 5*e*, the chain 117 and the rear wheel driven sprocket 116 are examples of a transmission mechanism.

As each of various elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A control system that controls an engine of a saddle-straddling type vehicle, comprising:

a transmission including an input shaft to which rotation of the engine is transmitted and an output shaft to which rotation of the input shaft is transmitted; and a rotational speed adjuster arranged to adjust a rotational speed of the engine such that the rotational speed of the engine is maintained in a target range when a separated state, in which rotation of the input shaft is not transmitted to the output shaft, continues for a predetermined period of time or longer.

2. The control system according to claim 1, wherein the rotational speed adjuster is arranged to adjust, when the separated state continues for the predetermined period of time or longer, the rotational speed of the engine such that the rotational speed of the engine is maintained in the target range until the separated state shifts to an engaged state where the rotation of the input shaft is transmitted to the output shaft.

3. The control system according to claim 2, further comprising:

a shift cam arranged to rotate according to a shifting operation by a driver; and a rotation angle detector arranged to detect a rotation angle of the shift cam; wherein the rotational speed adjuster is arranged to determine the engaged state and the separated state based on the rotation angle of the shift cam detected by the rotation angle detector.

4. The control system according to claim 1, further comprising:

an output shaft rotational speed detector arranged to detect information related to a rotational speed of the output shaft;

a shift cam arranged to rotate according to a shifting operation by a driver; and a rotation angle detector arranged to detect a rotation angle of the shift cam; wherein the rotational speed adjuster is arranged to set the target range based on results of detection by the output shaft rotational speed detector and the rotation angle detector.

5. The control system according to claim 1, wherein the transmission is arranged to transmit the rotation of the input shaft to the output shaft at a plurality of gear ratios including at least a first gear ratio and a second gear ratio that is smaller than the first gear ratio, and the target range is a range that is smaller than a first engine rotational speed when the transmission is set at the first gear ratio and larger than a second engine rotational speed when the transmission is set at the second gear ratio.

6. The control system according to claim 5, wherein a lower limit of the target range is a value obtained by adding a value of not less than about 30% of a difference between the first engine rotational speed and the second engine rotational speed to the second engine rotational speed, and an upper limit of the target range is a value obtained by adding a value of not more than about 70% of the difference to the second engine rotational speed.

7. The control system according to claim 5, wherein a lower limit of the target range is a value obtained by adding a value of not less than about 40% of a difference between the first engine rotational speed and the second engine rotational speed to the second engine rotational speed, and an upper limit of the target range is a value obtained by adding a value of not more than about 60% of the difference to the second engine rotational speed.

8. The control system according to claim 1, further comprising:

a shift cam arranged to rotate according to a shifting operation by a driver; and a rotation angle detector arranged to detect a rotation angle of the shift cam; wherein the rotational speed adjuster is arranged to determine the separated state based on the rotation angle of the shift cam detected by the rotation angle detector.

9. The control system according to claim 1, further comprising a vehicle speed detector arranged to detect information related to a traveling speed of the vehicle, wherein the rotational speed adjuster is arranged to the rotational speed of the engine such that the rotational speed of the engine is maintained in the target range when the information detected by the vehicle speed detector indicates a predetermined speed or higher and the separated state continues for the predetermined period of time or longer.

10. A vehicle comprising:

a drive wheel;

an engine;

a transmission including an input shaft to which rotation of the engine is transmitted and an output shaft to which rotation of the input shaft is transmitted;

a transmission mechanism arranged to transmit rotation of the output shaft of the transmission to the drive wheel; and a rotational speed adjuster arranged to adjust a rotational speed of the engine such that the rotational speed of the engine is maintained in a target range when a separated state, in which rotation of the input shaft is not transmitted to the output shaft, continues for a predetermined period of time or longer.

* * * * *